United States Patent

Lampe

[11] Patent Number: 5,984,376
[45] Date of Patent: Nov. 16, 1999

[54] CLOSED COUPLING MALE SPRING LOCK FITTING

[75] Inventor: Arthur F. Lampe, Hartland, Mich.

[73] Assignee: Automotive Fluid Systems, Inc., Troy, Mich.

[21] Appl. No.: 09/026,363

[22] Filed: Feb. 19, 1998

[51] Int. Cl.[6] .................................................. F16L 33/20
[52] U.S. Cl. ........................... 285/256; 285/351; 29/508; 29/509; 29/516
[58] Field of Search .................................... 285/256, 259, 285/351; 29/508, 509, 516

[56] References Cited

U.S. PATENT DOCUMENTS

| | | | |
|---|---|---|---|
| 2,453,997 | 11/1948 | MacWilliam | 285/256 |
| 2,939,728 | 6/1960 | Bitel . | |
| 3,453,005 | 7/1969 | Foults . | |
| 3,532,101 | 10/1970 | Snyder, Jr. . | |
| 3,569,903 | 3/1971 | Brishka . | |
| 3,929,357 | 12/1975 | De Vincent et al. . | |
| 3,933,378 | 1/1976 | Sandford et al. . | |
| 4,055,359 | 10/1977 | McWethy . | |
| 4,114,656 | 9/1978 | Kish . | |
| 4,369,992 | 1/1983 | Fournier | 285/256 |
| 4,544,187 | 10/1985 | Smith . | |
| 4,657,285 | 4/1987 | Akiyama et al. . | |
| 4,671,542 | 6/1987 | Juchnowski | 285/256 X |
| 4,684,157 | 8/1987 | Smith . | |
| 4,804,212 | 2/1989 | Vyse . | |
| 4,991,876 | 2/1991 | Mulvey . | |
| 5,022,687 | 6/1991 | Ariga . | |
| 5,096,234 | 3/1992 | Oetiker . | |
| 5,105,854 | 4/1992 | Cole et al. . | |
| 5,137,309 | 8/1992 | Beagle . | |
| 5,275,448 | 1/1994 | McNaughton | 285/256 X |

*Primary Examiner*—Dave W. Arola
*Attorney, Agent, or Firm*—Vanophem Meehan & Vanophem, P.C.

[57] ABSTRACT

A compact, lightweight closed coupling male spring lock fitting for direct connection to an air-conditioning hose having an inner sleeve, an outer sleeve and an annular cage, the inner sleeve having stepped portion that receives an inner surface of the annular cage. The annular cage surrounds the outer diameter of the inner sleeve and is spaced a distance from one end of the inner sleeve. The outer sleeve abuts an outer surface of the annular cage and prevents axial movement of the annular cage. The outer sleeve is retained in a retaining groove on the outer diameter of the inner sleeve, adjacent the stepped portion. The closed coupling of the outer sleeve and annular cage significantly reduces the overall length and weight of the fitting in comparison to prior art fittings and the inner sleeve may be machined opposed to conventional tube roll-forming processes.

7 Claims, 2 Drawing Sheets

CLOSED COUPLING MALE SPRING LOCK FITTING

BACKGROUND OF THE INVENTION

1. Field of the Invention

The present invention relates generally to quick-connect tubular couplings used on hose assemblies. In particular, the present invention relates to a quick-connect tubular coupling for direct connection to air-conditioning hoses.

2. Description of the Prior Art

As developments are made in the art of automotive air-conditioning systems, the components that go into the make-up of an air-conditioning system must also develop. A reduction in assembly time, ease of assembly, lower cost, lower weight, and improved durability are all goals that engineers strive to accomplish to reduce the cost and improve the quality of these components.

U.S. Pat. No. 4,055,359 to McWethy discloses a quick-connect fitting that claims to accomplish some of the above mentioned objectives. However, advances made in automotive air-conditioning systems require improvements above and beyond what is detailed in the '359 reference. In particular, size and weight reductions have become even more important as fuel economy and emissions restrictions are strictly regulated. Individual components must meet the strictest of size and weight limitations to reduce the overall vehicle weight, improve gas mileage, and reduce vehicle emissions.

The '359 reference discloses a quick-connect tubular coupling having a pair of tubes. A free end of one tube, or inner tube, is telescopically disposed within an end portion of the other tube, or outer tube. The outer tube has a flared end. An annular cage is mounted externally on the inner tube and is axially spaced from the end that is disposed in the outer tube. The cage has a circular spring disposed therein, that engages the flared end of the outer tube. The spring, the cage and the flared end of the outer tube prevent axial movement of one tube relative to the other. O-rings are compressed between the inner and outer tubes as a seal to prevent leakage.

The cage is retained from axial movement along the inner tube by roll-formed upset beads. The upset beads abut outer and inner surfaces of the cage base portion. What is not shown in the '359 reference, is the hose and the means for attaching the hose to the tubular coupling.

In a method presently known in the art, the inner tube further includes an outer sleeve spaced a distance from the free end of the inner tube. A hose is disposed between the inner tube and the outer sleeve and the outer sleeve is crimped around the hose, retaining the hose on the tubular coupling.

Similar to the retention method for the cage, the outer sleeve is retained from axial movement by roll-formed upset beads. Just as the upset beads abut the outer and inner surfaces of the cage base portion, upset beads abut the outer and inner surfaces of the outer sleeve base portion.

Manufacturing the coupling disclosed in the '359 reference involves multiple costly steps and close control of dimensional tolerances. The upset beads must be formed on either side of both the cage and the outer sleeve, necessitating formation of a total of four upset beads. The distance on the tube between the outer sleeve and the cage creates tolerance stack-ups that make dimensional control very difficult and manufacture very expensive. The time involved in completing the necessary tube forming operations is extensive and, as a result, manufacturing costs are high.

In addition, the cage must be spaced a predetermined distance from the outer sleeve in order to accommodate manufacturing of the upset beads. As a result, the coupling is longer, taking up valuable packaging space and adding unwanted weight. Further, because of the extended length of the coupling, the tolerance stack-ups are difficult to control. Accordingly, while the tubular coupling disclosed in the '359 reference has adequate retention and sealing capabilities, there is room for improvement where size and weight constraints are concerned.

What is needed is a closed coupling quick-connect fitting that is compact and lightweight. The fitting must be easy to manufacture and have good retention and sealing capabilities.

SUMMARY OF THE INVENTION

The present invention is a tubular fitting that operates to couple a pair of tubes in a manner novel to tubular couplings presently known in the art. The fitting of the present invention will accommodate an outer tube having a flared end that inserts into the annular cage surrounding the inner tube locked in place by a circular spring retained within the annular cage as currently known in the art and described in detail above. The present invention provides a means for retaining the annular cage that significantly reduces the size and weight of the fitting over fittings presently known in the art.

The present invention is a closed coupling male spring lock fitting having an inner sleeve, an outer sleeve and an annular cage. The inner sleeve is a generally elongated cylindrical body having a free end. The annular cage surrounds the outer diameter of the outer sleeve and is spaced a distance from the free end of the cylindrical body. The annular cage has a bottom portion that has inner and outer surfaces. The inner surface of the bottom portion of the annular cage rests against a step on the outer diameter of the inner sleeve and the outer surface of the bottom portion of the annular cage abuts one end of the outer sleeve.

The outer sleeve concentrically surrounds the inner sleeve opposite the free end of the inner sleeve, and is spaced a distance concentrically from the inner sleeve defining a space therebetween. The outer sleeve is crimped to retain a hose member in the space between the inner and outer sleeves. The end of the outer sleeve that abuts the outer surface of the cage portion is retained in a groove on the outer diameter of the inner sleeve. The outer sleeve abuts the outer surface of the cage member while the inner surface of the cage member abuts the stepped down portion on the outer diameter of the inner sleeve. This allows the cage member and the outer sleeve to work in close proximity to each other while retaining the cage portion on the inner sleeve without annular upset beads or other complicated tube end forming.

The closed coupling of the outer sleeve and the cage portion significantly reduces the overall length of the fitting in comparison to prior art fittings. Therefore, the present invention is significantly smaller and, therefore, more lightweight than prior art fittings.

The closed coupling of the outer sleeve and the cage portion also permits the stepped down portion and the groove in the fitting to be machined, which is much simpler and faster than conventional tube forming methods in which annular upset beads retain the cage and outer sleeve. Additionally, due to the close proximity of the outer sleeve and the cage, the dimensions of the fitting of the present invention can be reduced, thereby reducing tolerance stack-ups and simplifying manufacture. Simpler manufacture results in a much more cost effective product.

Accordingly, it is an object of the present invention to provide a closed coupling male spring lock fitting that is compact, lightweight and easy to manufacture.

It is another object of the present invention to mechanically lock the cage and the outer sleeve of a fitting without extensive roll-forming operations.

It is still another object of the present invention to provide a fitting made of machined aluminum.

It is yet another object of the present invention to reduce dimensional tolerance stack-ups by reducing the overall length of the fitting.

Further objects, features and advantages of the invention will become more apparent from a review of the brief description of the figures taken in conjunction with a detailed description of the preferred embodiment that follows.

DETAILED DESCRIPTION OF THE PREFERRED EMBODIMENT

Figure 1:
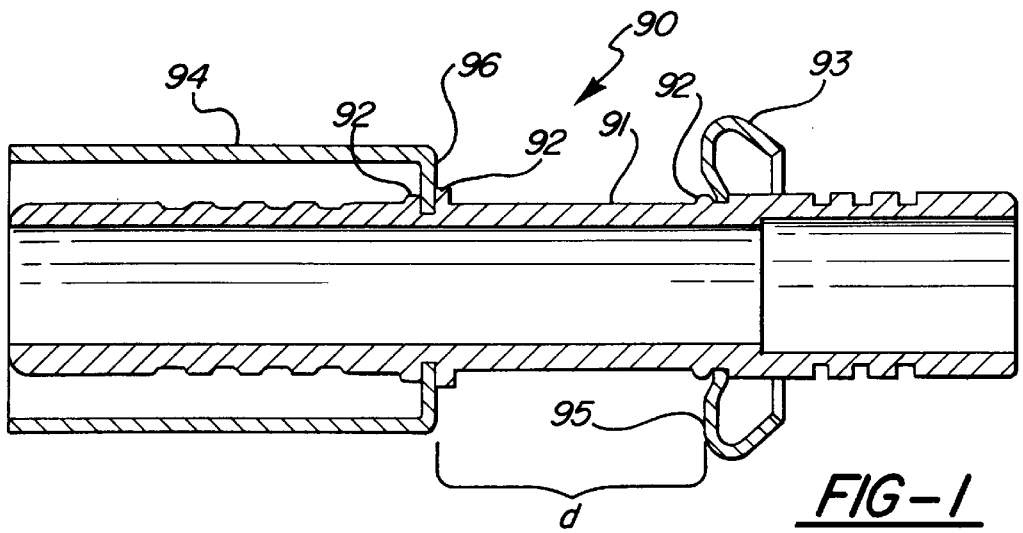
FIG. 1 is a partial cross-sectional view of a prior art conventional tube.

Referring to FIG. 1 there is shown a prior art tubular fitting 90. The conventional tubular fitting includes an elongated cylindrical inner sleeve 91 having a plurality of annular upset beads 92 for retaining a cage member 93 and an outer sleeve 94. The process used to form the conventional tubular fitting requires extensive roll-forming operations to produce the annular upset beads 92 that retain the cage 93 and outer sleeve 94 on the inner sleeve 91.

The prior art fitting 90 has a distance d between an outer edge 95 of the cage 93 and a closed end 96 of the outer sleeve 94. The distance d is required in order to allow forming of the annular upset beads 92. Because there are dimensional tolerances in the manufacturing process, the tolerances are harder to control for longer dimensions. The longer the workpiece, the higher the tolerance stack-up, and the more difficult the process is to control to specified tolerances.

Figure 2:
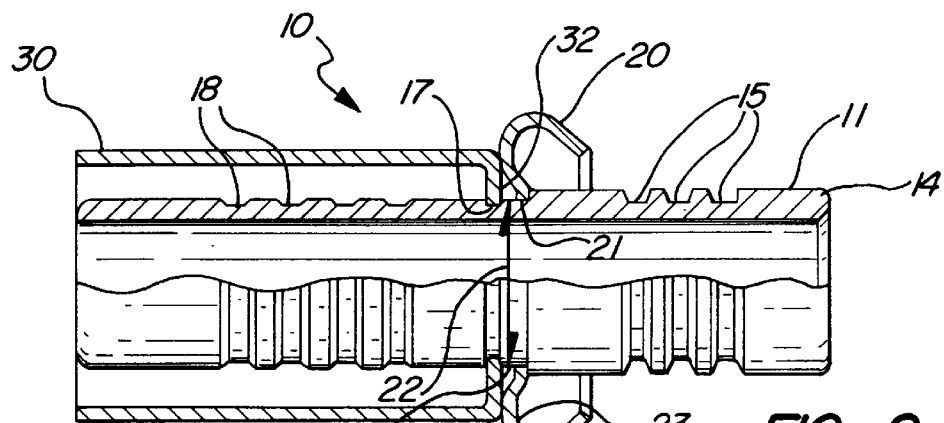
FIG. 2 is a side view in partial cross section of the closed coupling male spring lock fitting of the present invention.
Figure 3:
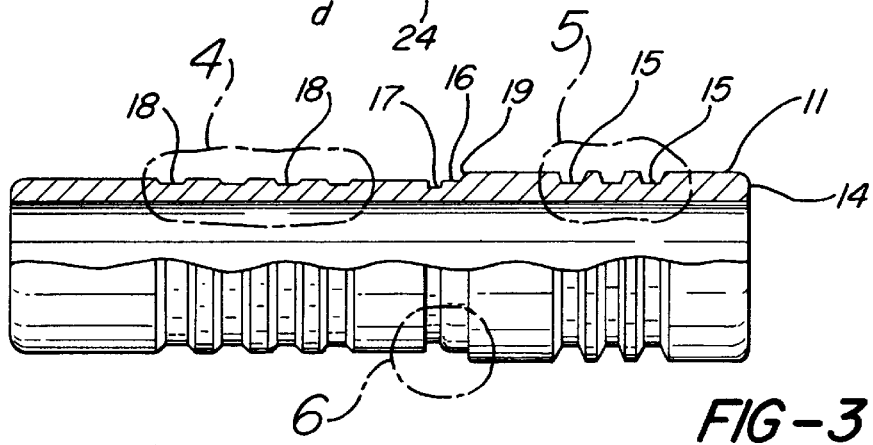
FIG. 3 is a side view in partial cross section of the inner sleeve of the fitting of the present invention.

A closed coupling male spring lock fitting, or fitting 10, according to the present invention, as best shown in FIG. 2, is an improvement over the prior art fitting 90 described above. The fitting 10 has an elongated cylindrical inner sleeve 11, an annular cage member 20 and an outer sleeve 30.

Figure 5:
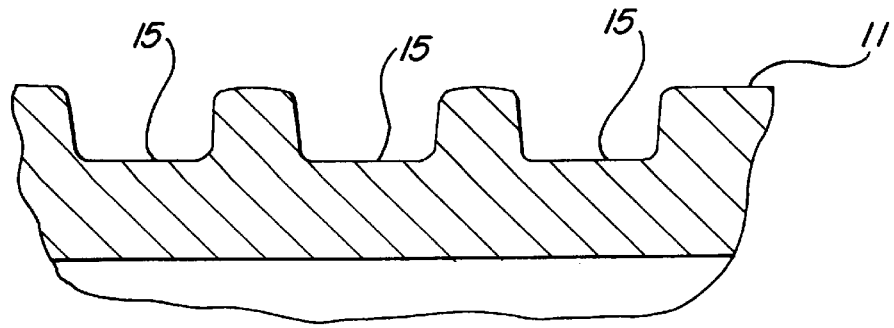
FIG. 5 is an enlarged detail view, of the circle labeled 5 on FIG. 3, of the O-ring grooves of the inner sleeve of the present invention.

The cylindrical inner sleeve 11 has an open free end 14, and spaced a distance from the open free end 14, is at least one, and more preferably, a plurality of grooves 15 machined in the outer diameter of the inner sleeve 11. The plurality of grooves 15 hold O-rings (not shown) for sealing the coupling connection when the male connection is mounted to the female connection (not shown). The plurality of grooves 15 are shown in detail in FIG. 5.

Figure 4:
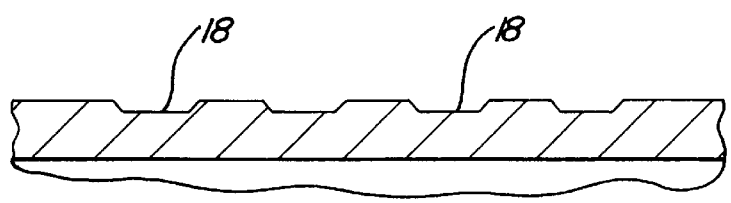
FIG. 4 is an enlarged detail view, of the circle labeled 4 on FIG. 3, of the grooves of the inner sleeve that retain a hose member.
Figure 6:
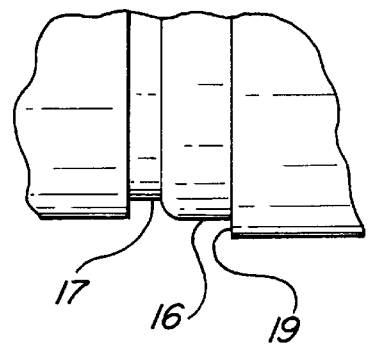
FIG. 6 is an enlarged detail view, of the circle labeled 6 on FIG. 3, of the machined grooves that retain the cage and outer sleeve of the closed fitting of the present invention.

Spaced a distance from the plurality of grooves 15 is a stepped down portion 16 in the outer diameter of the inner sleeve 11 for locating the annular cage member 20 on the inner sleeve 11. Immediately adjacent the stepped down portion 16 is a retaining groove 17 for the outer sleeve. The stepped down portion 16 and retaining groove 17 are shown in detail in FIG. 6. Beyond the stepped down portion 16 and retaining groove 17, a plurality of grooves 18, as best shown in detail in FIG. 4, are located in the outer diameter of the inner sleeve which are adapted to grip a hose member upon assembly of the coupling to the hose (not shown). With reference to FIG. 6, it is to be noted that the outer diameter of the inner sleeve beyond the stepped down portion 16 is smaller than the outer diameter of the inner sleeve 11 near the open free end 14. This is for a purpose to be discussed hereinafter.

Referring to FIG. 2, the annular cage member 20 surrounds the stepped down portion 16 between the O-ring grooves 15 and the grooves 18 for crimping and retaining the hose end. The annular cage member 20 has a central opening 21 which mounts to the stepped down portion 16 of the inner sleeve 11. This is accomplished by sliding the annular cage member 20 over the reduced diameter portion of the inner sleeve member and advancing the cage towards the stepped down portion 16 so as to locate the annular cage member 20 from the free end by resting against the stepped down portion 16.

The annular cage member 20 has an inner diameter 22 and a thickness having an inner surface 23 and an outer surface 24. The inner diameter 22 mounts to the stepped down portion 16 and the inner surface 23 abuts a shoulder 19 between the outer diameter of the inner sleeve 11 nearest to the open free end 14 and the diameter of the stepped down portion 16, such that the shoulder 19 locates the annular cage member 20 axially on the inner sleeve 11 and prevents axial movement of the annular cage member 20 in the direction towards the free end 14 of the inner sleeve 11.

Figure 7:
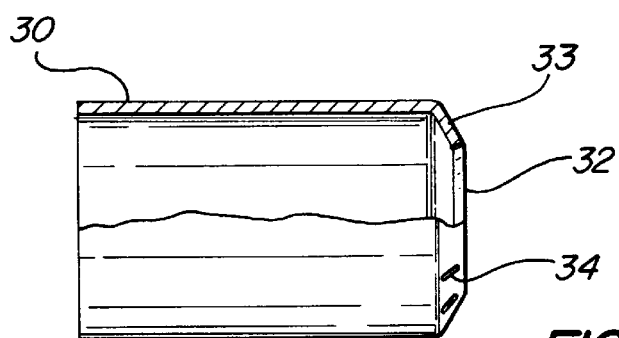
FIG. 7 is a side view shown in partial cross section of the outer sleeve of the present invention.
Figure 8:
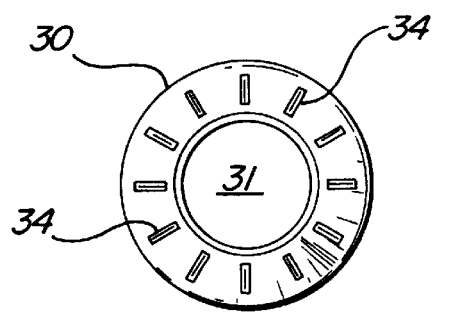
FIG. 8 is an end view of the outer sleeve of the present invention.

Referring now to FIG. 7 and FIG. 8, the outer sleeve 30 is described. The outer sleeve 30 is a generally cylindrical elongated body having a reduced diameter portion defined by an opening 31 therethrough. The reduced diameter portion is accomplished by flaring the cylindrical sleeve 30 at an end 32 thereof so as to define a beveled edge 33 provided with a plurality of clefts or notches 34 therein. The beveled edge 33 and plurality of clefts 34 permit the outer sleeve 30 to radially expand and contract, locking the outer sleeve 30 in place over the inner sleeve 11. The plurality of clefts 34 of the beveled edge 33 allow the opening 31 to slide over the reduced diameter portion of the inner sleeve and abut the cage member. Upon abutting the cage member the beveled edge bends to move the flared beveled edge into the retaining groove 17 and thereby secure the outer sleeve 30 onto the inner sleeve 11.

The end 32 of the outer sleeve 30 locks in the retaining groove 17 of the inner sleeve 11, as best shown in FIG. 2. After the outer sleeve 30 is positioned on the inner sleeve 11, the plurality of clefts 34 allow the opening 31 to return to its original shape, thereby locking the end 32 of the outer sleeve 30 into the retaining groove 17. The beveled edge 33 of the end 32 abuts the outer surface 24 of the annular cage member 20 and is no longer beveled, but in vertical abutment with the annular cage member 20 as best shown in FIG. 2.

Because the outer sleeve 30 abuts the bottom portion of the annular cage member 20, distance d is zero, or at least minimized, resulting in a shorter fitting. The shorter length reduces the tolerance stack-ups that complicate manufacturing, and reduces the overall size and weight of the fitting. The result is a lighter, smaller, more cost effective quick-connect coupling.

According to the present invention, the mounting of the outer sleeve 30, of the fitting 10 mechanically locks the annular cage member 20 onto the inner sleeve 11, preventing axial movement of the annular cage member 20 along the inner sleeve 11. Accordingly, there is no need to provide annular upset beads 92 as in prior art couplings 90 that hold the cage member 93 and the outer sleeve 94 in place on the elongated cylindrical sleeve 91. In the fitting 10 of the present invention, the outer sleeve 30 is locked in place on the inner sleeve 11 by the retaining groove 17, and the annular cage member 20 is mechanically locked in place at the outer surface by the outer sleeve 30 and at the inner surface by the stepped down portion 16 of the inner sleeve 11.

The plurality of grooves 15, the stepped down portion 16, the retaining groove 17, and the plurality of grooves 18 are all capable of being manufactured by machining a material such as aluminum. The manufacturing steps involved in machining an aluminum component are much faster and easier to control than conventional roll-forming operations. As a result, the tighter tolerance control of the fitting 10 of the present invention allows the plurality of grooves 15, stepped down portion 16, the retaining groove 17 and the plurality of grooves 18 to be machined in close proximity to each other resulting in a significantly more compact and lightweight fitting.

The closed coupling of the outer sleeve and cage member significantly reduces the overall length of the fitting in comparison to prior art fittings. The closed coupling of the outer sleeve and cage member also permits the fitting to be machined in a much simpler and faster method than conventional tube end forming methods. The close proximity of the outer sleeve and the cage member allow the dimensions of the fitting to be reduced over prior art fittings, reducing tolerance stack-ups and simplifying manufacture. The closed coupling of the present invention is compact and lightweight, easy to manufacture with good retention and sealing capabilities.

It is understood that the present invention is not limited by the preferred embodiment described above and is capable of modifications and changes as known to one skilled in the art. The above detailed description is to be taken in conjunction with the drawings and the following claims.

What is claimed is:

1. A tubular fitting for at least one tubular member, said tubular fitting comprising:

an inner tubular sleeve having a first end, a second end and an outer diameter, said outer diameter having an annular stepped down portion defining a shoulder spaced a predetermined distance from said first end, said outer diameter having a machined groove adjacent said annular stepped down portion;

an annular cage member having an opening therethrough for receiving said inner tubular sleeve, said annular cage member having an inner diameter, and a thickness defining inner and outer surfaces, said inner surface of said annular cage member abutting said shoulder of said annular stepped down portion of said inner tubular sleeve; and an outer tubular sleeve axially surrounding said inner tubular sleeve at said second end of said inner tubular sleeve, said outer tubular sleeve having an opening therethrough for receiving said inner tubular sleeve, an end of said outer tubular sleeve abutting said outer surface of said annular cage member, said end being retained in said machined groove of said inner tubular sleeve so that said annular cage member is prevented from axial movement by said outer tubular sleeve and said shoulder.

2. A tubular fitting as claimed in claim 1 wherein said end of said outer tubular sleeve further comprises a beveled edge retained in said machined groove adjacent said annular stepped down portion, said beveled edge of said end abutting said outer surface of said annular cage member.

3. A tubular fitting as claimed in claim 2 wherein said beveled edge of said outer tubular sleeve further comprises a plurality of clefts therein for allowing said opening of said outer tubular sleeve to expand and contract.

4. A tubular fitting as claimed in claim 1 wherein said inner tubular sleeve further comprises:

at least one groove spaced a predetermined distance from said first end of said inner tubular sleeve between said first end of said inner tubular sleeve and said annular stepped down portion.

5. A tubular fitting as claimed in claim 1 wherein said inner tubular sleeve further comprises a plurality of grooves spaced a predetermined distance from said second end, said plurality of grooves for engaging said at least one tubular member.

6. A tubular fitting for at least one tubular member, said tubular fitting comprising:

an inner tubular sleeve having a first end, a second end and an outer diameter, said outer diameter having an annular stepped down portion defining a shoulder spaced a predetermined distance from said first end, said outer diameter having a machined groove adjacent said annular stepped down portion, said inner tubular sleeve having at least one groove spaced a predetermined distance from said first end between said first end of said inner tubular sleeve and said annular stepped down portion, said inner tubular sleeve having a plurality of grooves spaced a predetermined distance from said second end, said plurality of grooves for engaging said at least one tubular member;

an annular cage member having an opening therethrough for receiving said inner tubular sleeve, said annular cage member having an inner diameter, and a thickness defining inner and outer surfaces, said inner surface of said annular cage member abutting said shoulder of said inner tubular sleeve; and an outer tubular sleeve axially surrounding said inner tubular sleeve at said second end of inner tubular sleeve, said outer tubular sleeve having an opening therethrough for receiving said inner tubular sleeve, said outer tubular sleeve having an end having a beveled edge, said beveled edge of said end abutting said outer surface of said annular cage member, said beveled edge of said outer tubular sleeve further comprising a plurality of clefts therein for allowing said opening to expand and contract, said end being retained in said machined groove of said inner tubular sleeve so that said annular cage member is prevented from axial movement by said outer tubular sleeve and said shoulder.

7. A method of assembling a tubular fitting to a tubular member, said method comprising the steps of:

inserting an annular cage member having an opening therethrough over an inner tubular sleeve having a first end, a second end and an outer diameter, said outer diameter having an annular stepped down portion defining a shoulder spaced a predetermined distance from said first end, said outer diameter of said inner tubular sleeve having a machined groove adjacent said annular stepped down portion whereby said annular cage member abuts said shoulder of said annular stepped down portion of said inner tubular sleeve; and sliding an outer tubular sleeve over said second end of said inner tubular sleeve, said outer tubular sleeve having an opening therethrough for receiving said inner tubular sleeve, an and of said outer tubular sleeve being retained in said machined groove of said inner tubular sleeve and abutting said annular cage member so that said annular cage member is prevented from axial movement by said outer tubular sleeve and said shoulder.

\* \* \* \* \*

UNITED STATES PATENT AND TRADEMARK OFFICE
CERTIFICATE OF CORRECTION

PATENT NO : 5,984,376
DATED : November 16, 1999
INVENTOR(S) : Lampe

It is certified that error appears in the above-identified patent and that said Letters Patent are hereby corrected as shown below:

Title page, Item 57 (Abstract), line 4, after "having" insert ----a----.

Column 8, line 6, delete "an and" and insert ----an end----.

Signed and Sealed this

Tenth Day of April, 2001

Attest:

NICHOLAS P. GODICI

Attesting Officer

Acting Director of the United States Patent and Trademark Office